(12) United States Patent
Becher

(10) Patent No.: US 10,226,031 B2
(45) Date of Patent: Mar. 12, 2019

(54) FLOATING WATER-FILLED RING TUBE FOR GROWING 2000 TON SEAFOOD AND FISH

(71) Applicant: Yona Becher, Budd Lake, NJ (US)

(72) Inventor: Yona Becher, Budd Lake, NJ (US)

(*) Notice: Subject to any disclaimer, the term of this patent is extended or adjusted under 35 U.S.C. 154(b) by 0 days.

(21) Appl. No.: 15/731,734

(22) Filed: Jul. 25, 2017

(65) Prior Publication Data

US 2019/0029231 A1  Jan. 31, 2019

(51) Int. Cl.
| | | |
|---|---|---|
| A01K 61/00 | (2017.01) | |
| A01K 61/10 | (2017.01) | |
| A01K 61/60 | (2017.01) | |
| A01K 61/75 | (2017.01) | |
| A01K 61/78 | (2017.01) | |

(52) U.S. Cl.
CPC .............. *A01K 61/10* (2017.01); *A01K 61/60* (2017.01); *A01K 61/75* (2017.01); *A01K 61/78* (2017.01)

(58) Field of Classification Search
CPC ........ A01K 61/75; A01K 61/60; A01K 61/65; A01K 61/78
See application file for complete search history.

(56) References Cited

U.S. PATENT DOCUMENTS

| | | | | |
|---|---|---|---|---|
| 4,244,323 A | * | 1/1981 | Morimura | A01K 61/60 119/223 |
| 4,506,623 A | * | 3/1985 | Roper | B63B 7/06 114/256 |
| 5,299,530 A | * | 4/1994 | Mukadam | A01K 61/60 119/223 |
| 5,617,813 A | * | 4/1997 | Loverich | A01K 61/60 119/223 |
| 5,970,917 A | * | 10/1999 | Keith, Jr. | A01K 61/60 119/223 |
| 6,216,635 B1 | * | 4/2001 | McRobert | A01K 61/60 119/201 |
| 7,587,991 B2 | * | 9/2009 | Buck | A01G 33/00 119/234 |
| 2005/0235921 A1 | * | 10/2005 | Niezrecki | A01K 61/60 119/223 |

(Continued)

FOREIGN PATENT DOCUMENTS

| | | | | |
|---|---|---|---|---|
| JP | 03251131 A | * | 11/1991 | |
| JP | 2012231732 A | * | 11/2012 | |
| WO | WO-2006043116 A1 | * | 4/2006 | ............. A01K 61/60 |

*Primary Examiner* — Son T Nguyen

(57) ABSTRACT

Large capacity fish and seafood growing aquaculture comprises multiple floating at sea concentric transparent torus tubes with central barge equipped with air compressor, electronic controller and anchored to seabed. Floating level above sea level of aquaculture torus tube is controlled by floating level sensor input triggering compressor to inflatable helical balloon wrapped around aquaculture tube and commanded by electronic controller. Water level in each tube is controlled by air pressure actuated valves. Each tube consists of four torus tube segments which are constructed of strong molded structural helical pipe wrapped into torus shape with molded resilient helical strip wall and with sealed helical inflatable balloon to control tube buoyancy level with connection to four vertical pipes for external rapid insertion and removing fish and food into and from the tubes. Cabled means connected to seabed.

2 Claims, 18 Drawing Sheets

(56) References Cited

U.S. PATENT DOCUMENTS

| | | | |
|---|---|---|---|
| 2006/0102087 A1* | 5/2006 | Page | A01K 61/60 119/223 |
| 2008/0245286 A1* | 10/2008 | Adamo | B63B 35/44 114/267 |
| 2011/0315085 A1* | 12/2011 | Lindgren | A01K 61/60 119/203 |
| 2015/0150223 A1* | 6/2015 | Robinson | A01K 63/047 119/223 |
| 2016/0183501 A1* | 6/2016 | Page | A01K 61/60 119/223 |

* cited by examiner

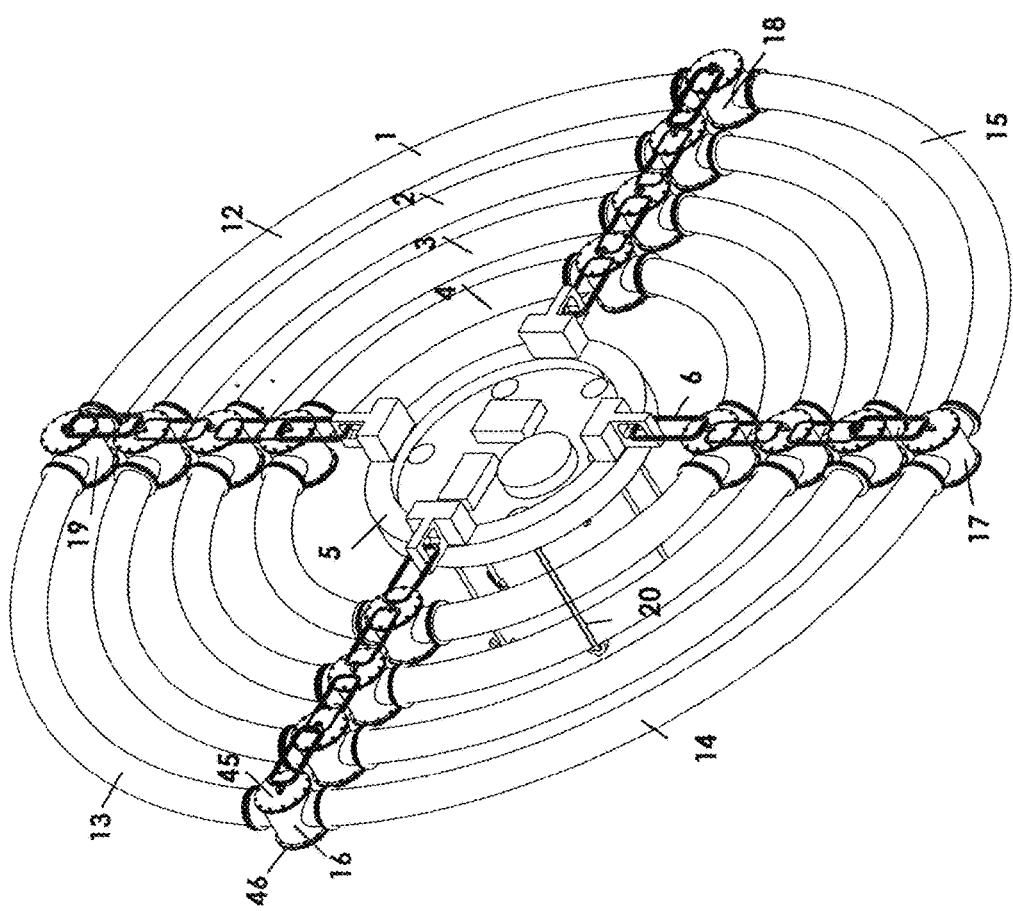

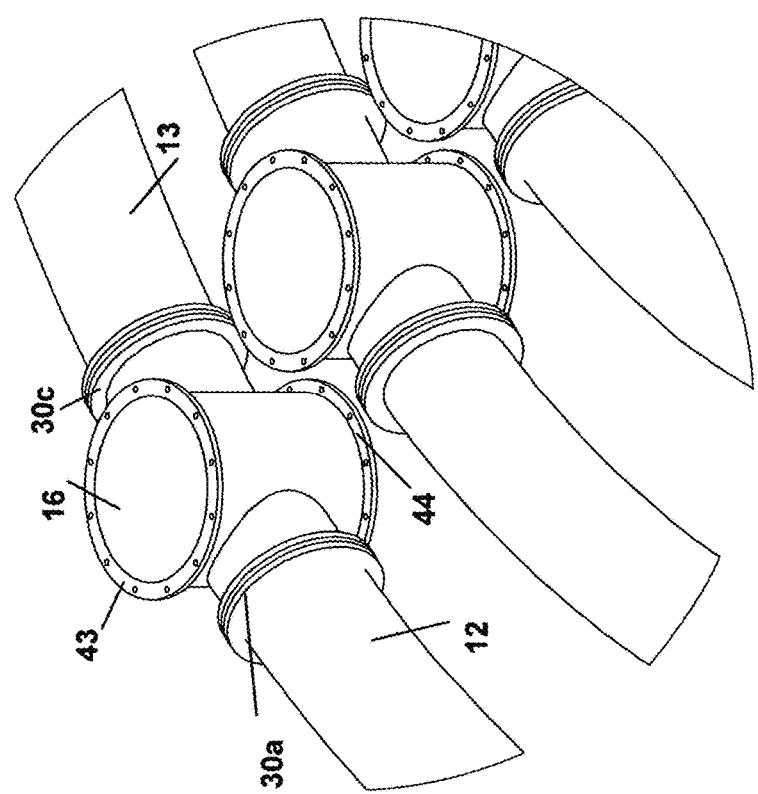

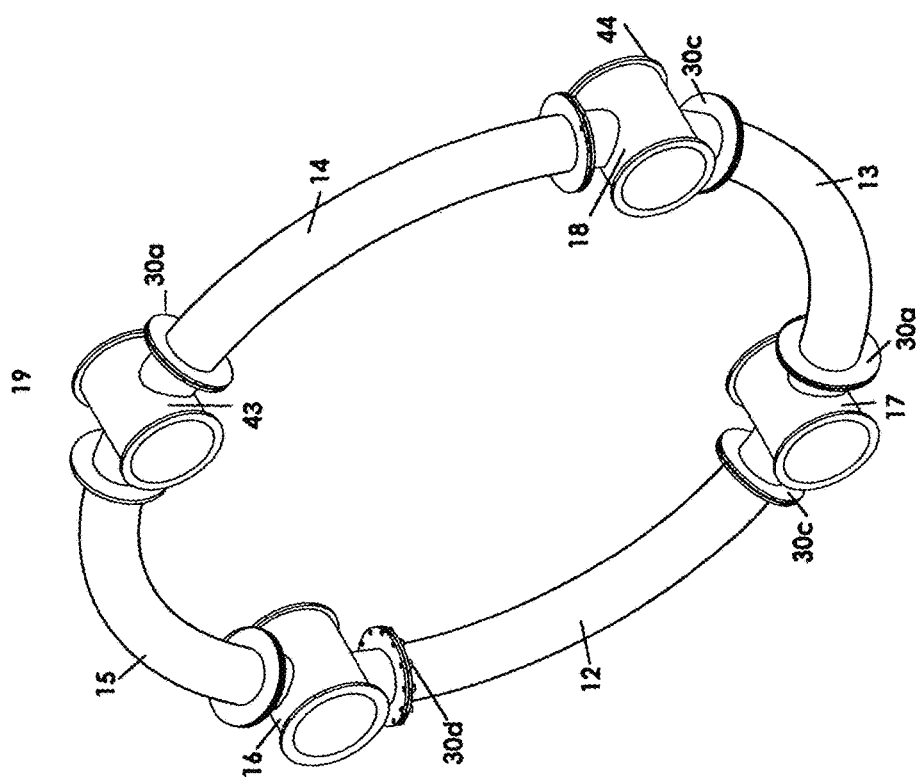

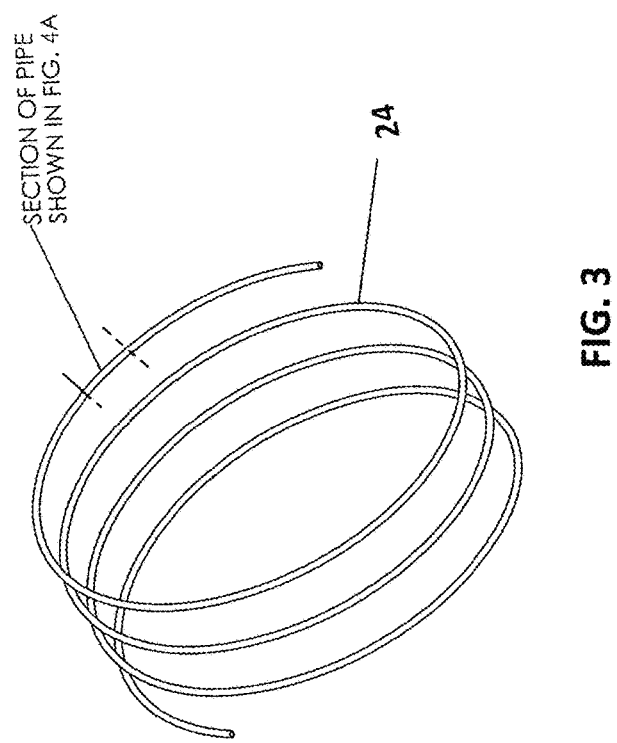

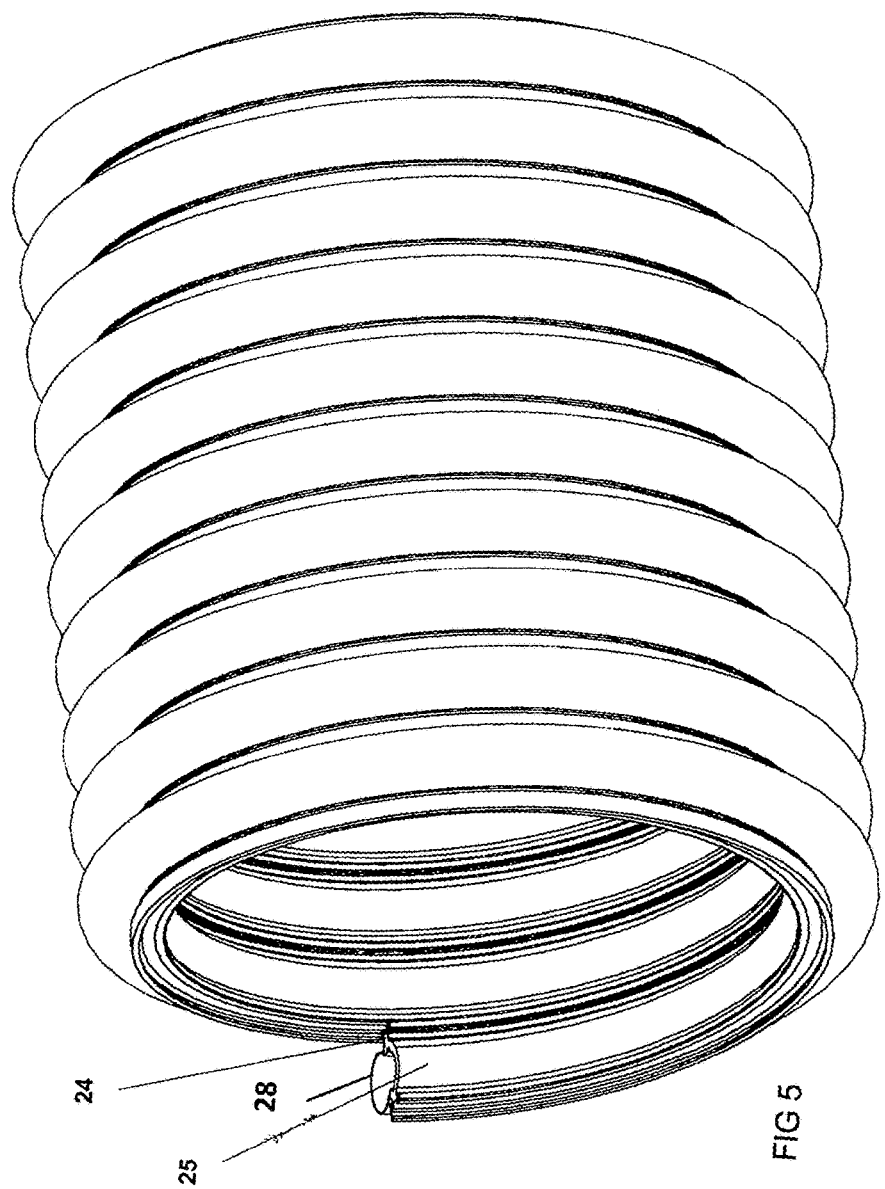

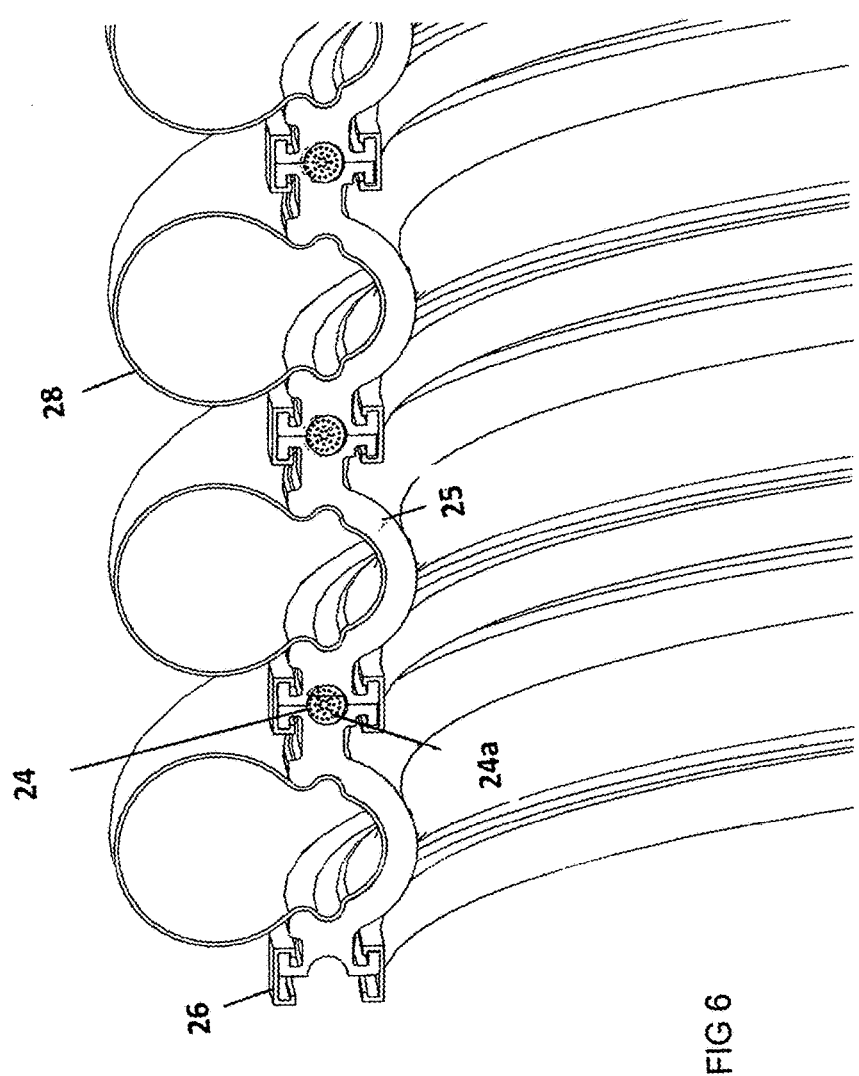

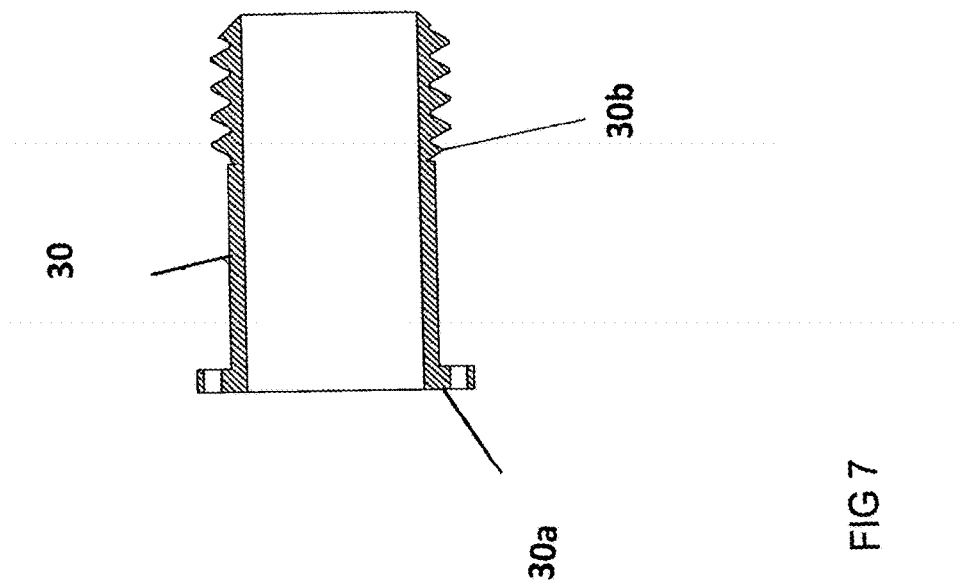

SECTION B-B

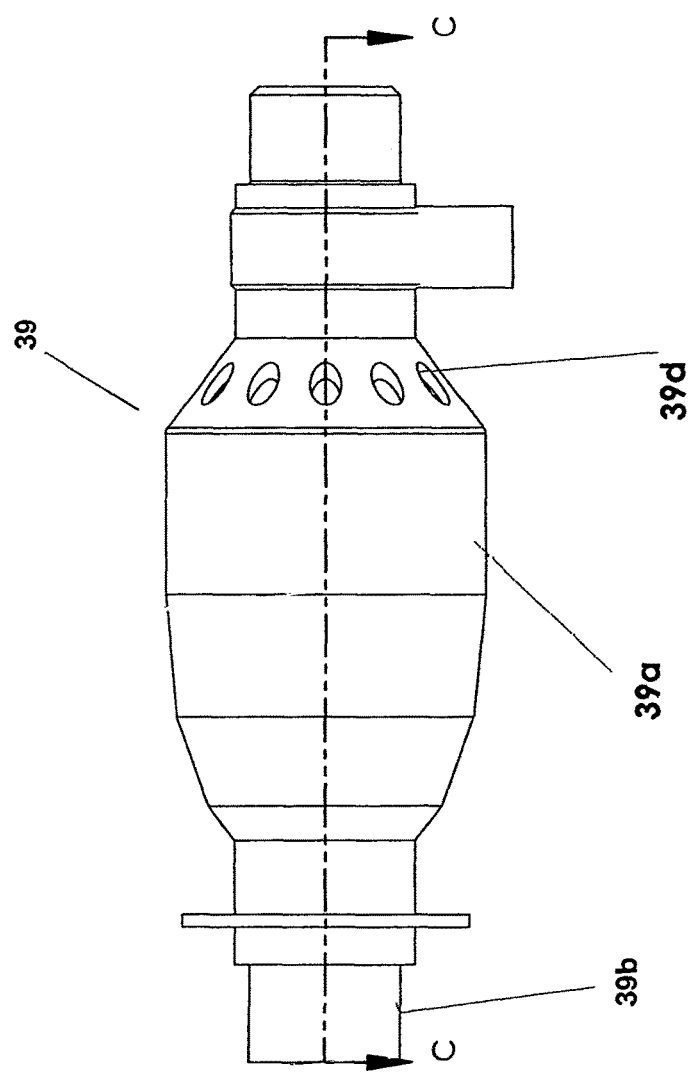

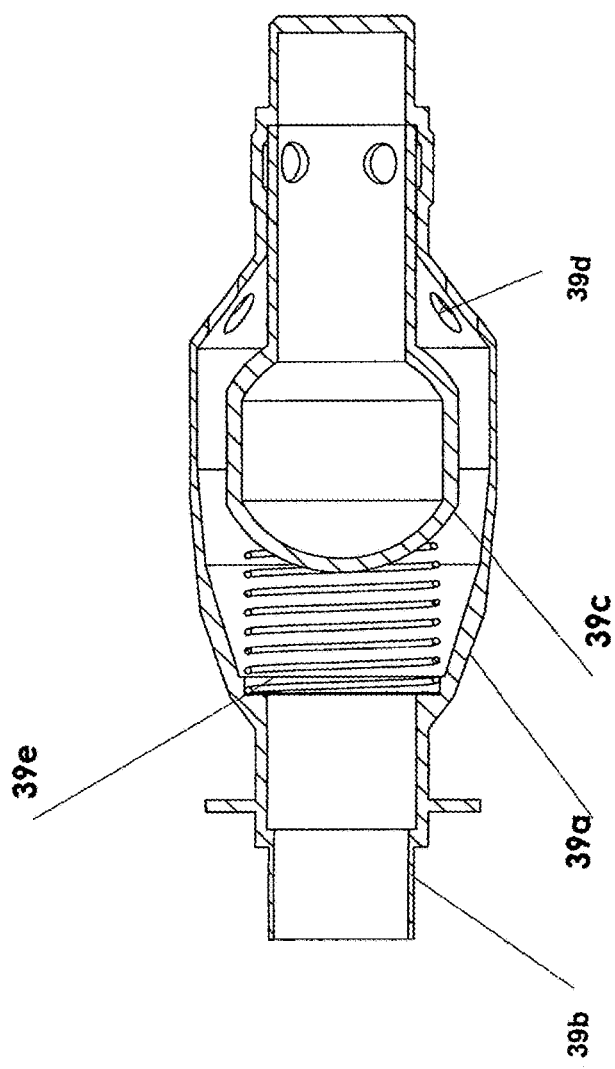
SECTION C-C       FIG 10 A

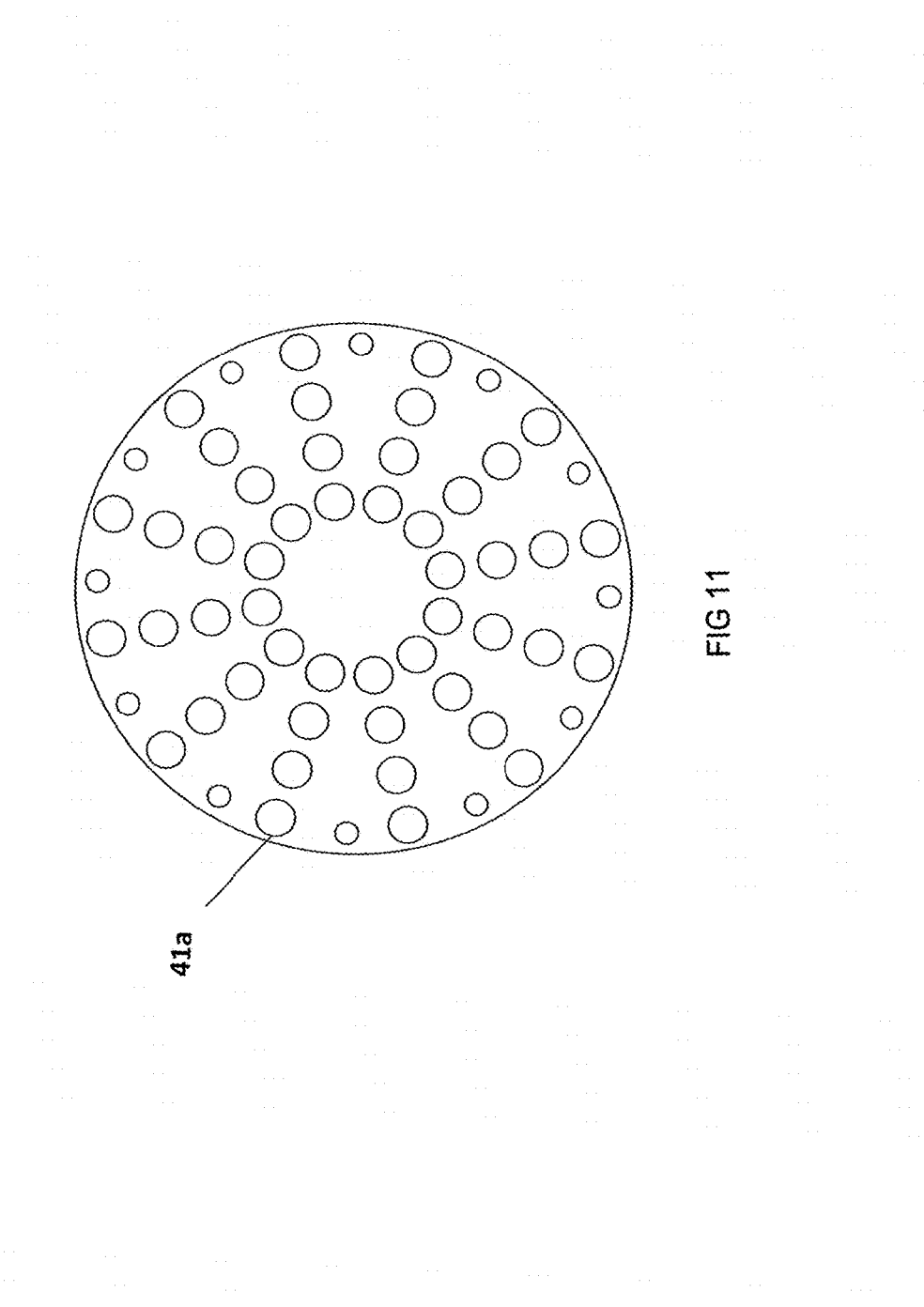

FLOATING WATER-FILLED RING TUBE FOR GROWING 2000 TON SEAFOOD AND FISH

BACKGROUND OF THE INVENTION

(A) Field of the Invention

With the fish and sea food becoming main healthy food in America and around the world, it with more than 250 billion dollars international food business annually spent on consuming fish and seafood in America alone, there is major demand for fresh fish rather than frozen fish imported from thousands of miles away. Undoubtedly, fishing of variety of types of fish and sea food in the seas and oceans of the world is now limited due to the disappearance of many types of fish due to over fishing or due to predators killing other types of fish. Therefore, so-called wild fishing in oceans cannot provide enough fresh fish and sea food of many types of popular fish sea food types at reasonable price to more than 330 million Americans and to more than 7 billion people of the world.

During hundreds year of out of control fishing in seas and oceans around the world, many types of fish and sea food did not survive and disappeared due to overfishing or by other fish types. Raising fish in sea farms mostly far from America create health problems too many types of fish. The U.S. currently imports more than 85 percent of its fish and seafood, with more than 10 billion pounds of shrimps, half of which comes from aquaculture farming and more than 40% comes from wild fishing at international waters far away from America's shores. For this reason, the price of common fresh fish such as Salmon and Tilapia in supermarket or restaurants in America is very expensive and usually exceeds $10 per pound which makes it exclusive food for the high income population and in many cases unaffordable for the poor and middle class which means that healthy sea food is not readily available to many tens of millions of hard working Americans.

In addition, the field of the invention includes creating new high typical volume of 2000 cubic meters per toroid doughnut ring shape water filled tube floating in the sea water and anchored to the seabed with each ring circumference exceeds 600 meters available for the fish to swim around. In each water filled ring tube there are only one or more selected types of ship to prevent certain fish type killing and eating other weaker types. It would provide high volume new domestic sources along the Atlantic and Pacific oceans and along ocean and seashores all over America and around the world aiming at solving the lack of available supply of fresh seafood to meet the new increased demand at low cost all over the world. The new large volume fish and seafood source would guarantee daily supply of tens of thousands of tons of fresh local supply of healthy seafood for decades to come at lower price, and will replace historical low technology fishing in far from home rough oceans, thousands of miles away. In most oceans such as Atlantic and Pacific certain fish species and seafood are vanishing and their prices are soaring in American restaurants and in restaurants around the world where low income people cannot afford paying for high quality fish and seafood. Therefore, the invention is related to developing a high-volume of steady and reliable supply of high quality fish and seafood of pre-selected types, raised along the seashores of America and along seashores around the world.

Furthermore, domestic fish and seafood business creates millions of jobs in America and around the world and supports vibrant coastal community's economies along seashores.

Prior Art Summary

US Patent No. US 20150150223 A1 to Robinson describe a system for circulating water of rearing space for aquatic organisms in a large volume containing of water and organisms. A water pump to pump water from intake through to create circulation of the water within the enclosure. However, Robinson offers a water pump for water circulation but do not define a closed-volume water-filled floatable ring tube with floatation level control in which fish and seafood grow and swim while being isolated from surrounding sea water.

US Patent No. US 20110315085 A1 to Lindgren describe a floating fish cage and holding pen made of molded structure with junctions connecting tube members with screen attachment that may be free floating, secured to a structure, or lowered to the ocean bottom and with addition of a tower for navigation and communication intended for open ocean offshore aquaculture. However, Lindgren offers floating fish cage with screen but Lindgren do not define a closed-volume water-filled floatable ring tube with floatation level control in which fish and seafood grow and swim while being isolated from surrounding sea water.

US Patent No. US 20050235921 A1 to Niezrecki and Kim describe a self-deployable open ocean aquaculture cage that includes at least one elongate flexible support member having an open interior for receiving a fluid and a net that forms an enclosure capable of retaining fish. However, Niezrecki and Kim offer open ocean cage but they do not define a closed-volume, water-filled floatable ring tube with floatation level control in which fish and seafood grow and swim while being isolated from surrounding sea water.

U.S. Pat. No. 7,587,991 B2 to Buck and Buchholz describes a floating macro algae and mussels support device made of flexible two rings with net that forms enclosure may be free floating, secured to a structure, or lowered to the ocean related to open ocean offshore aquaculture. However, Buck and Buchhold offer two rings with net but they do not define a closed-volume, water-filled floatable ring tube with floatation level control in which fish and seafood grow and swim while being isolated from surrounding sea water.

U.S. Pat. No. 6,216,635 B1 to McRobert describes a fish pen with net made of buoyant flexible support members with net that forms enclosure and lifting device with divers controlling the fish capturing in underwater pen. Tanks which may be free floating, secured to a structure, or lowered to the ocean elated to open ocean offshore aquaculture. However, McRobert offers a fish pen with net but McRobert do not define a closed-volume, water-filled floatable ring tube with floatation level control in which fish and seafood grow and swim while being isolated from surrounding sea water.

U.S. Pat. No. 5,970,917 A to Keith describes a marine aquaculture apparatus comprises a submersible torus-shaped enclosure having perforations holes. Structure is provided for raising and lowering the enclosure in a body of water. It is a fish pen with net made of buoyant flexible support members with net that forms enclosure. However, Keith offers a submersible torus-shaped enclosure having perforations holes, but Keith do not define a closed-volume sealed-wall water-filled floatable ring tube with floatation level control in which fish and seafood grow and swim while being isolated from surrounding sea water.

U.S. Pat. No. 5,617,813 A to Loverich, Swanson and Goudey describes a marine aquaculture mobile pen free-floating, with mobility under currents to fish harvesting location with net-supported by ring with optional anchoring. However, Loverich, Swanson and Goudy offers a mobile pen free-floating under marine currents, but they do not define a closed-volume, sealed-wall, water-filled floatable ring tube with floatation level control in which fish and seafood grow and swim while being isolated from surrounding sea water.

U.S. Pat. No. 5,299,530 A to Mukadam and Morgan describes a marine aquaculture apparatus comprises a submergible enclosed net fish cage comprising: a float; a fish cage. However, Mukadam and Morgan offer a submergible net fish cage, but they do not define a closed-volume sealed-wall water-filled floatable ring tube with floatation level control in which fish and seafood grow and swim while being isolated from surrounding sea water.

U.S. Pat. No. 4,244,323 A to Morimura describes a marine aquaculture apparatus comprises an apparatus for floating and sinking fish breeding netted tanks. However, Morimura offers a floating and sinking fish breeding netted tanks, but Morimura do not define a closed-volume, sealed-wall water-filled floatable ring tube with floatation level control in which fish and seafood grow and swim while being isolated from surrounding sea water.

U.S. Pat. No. 4,506,623 A to Roper and Herrera describes a buoyant marine storage vessel for fluids, such as oil, includes a flexible containment bag having at least a controllable inlet and outlet for fluids and a wire rope cage for the bag. However, Roper and Herrera offer a flexible containing bag for fluids such as oil with wire rope cage, but they do not define a closed-volume sealed-wall water-filled floatable ring tube with floatation level control in which fish and seafood grow and swim while being isolated from surrounding sea water.

US Patent No. US 20080245286 A1 to Adamo describes a floating structures for the installation of equipment such as wind turbines and solar power plants. The floating body that provides required buoyancy for the overall structure to float. However, Adamo offers floating structures for installation of various equipments, but Adamo do not define a closed-volume sealed-wall water-filled floatable ring tube with floatation level control in which fish and seafood grow and swim while being isolated from surrounding sea water.

WO 2006/043116 A1 Titled: Technical, Technological and ecological Solution for Tuna Fish by Zankl Frano Improving the Towing and anchoring of an aquaculture cage with net for tuna equipment by boat. However, Zankl Frano offers a towing and anchoring cage, but Zankl Frano do not define a closed-volume sealed-wall water-filled floatable ring tube with floatation level control in which fish and sea food grow and swim while being isolated from surrounding sea water.

JP 03251131 A titled: Crawl Frame

BY Morita Tetsuo, Sakuraoka Makuto and Kozono Yasushi

Improving crawl frame design of aquaculture frame with net. However, Morita Tetsuo, Sakuraoka Makuto and Kozono Yasushi offer a crawl frame with net, but they do not define a closed-volume sealed-wall water-filled floatable ring tube with floatation level control in which fish and sea food grow and swim while being isolated from surrounding sea water.

JP02012231732A

Titled: Method for Recovering Middle-Layer Floating Fish Bank and recovering tool with cables.

By Swada, Masayuki and Yamagata Shohei

Method for recovering middle-layer floating fish bank and recovering tool with cables. However, Swada, Masayuki and Yamagata Shohei offer a method for recovering floating fish bank and recovering tool, but they do not define a closed-volume sealed-wall water-filled floatable ring tube with floatation level control in which fish and sea food grow and swim while being isolated from surrounding sea water.

U.S. Pat. No. 9,655,347 by Troy et al. suggests open ocean fish farm. However, Troy et al. offer an open ocean fish farm, but they do not define a closed-volume sealed-wall water-filled floatable ring tube with floatation level control in which fish and sea food grow and swim while being isolated from surrounding sea water.

U.S. Pat. No. 8,028,660 by Troy offers automated positioning and submersible open ocean platform. However, Troy offers open submersible ocean platform, but Troy does not define a closed-volume sealed-wall water-filled floatable ring tube with floatation level control in which fish and sea food grow and swim while being isolated from surrounding sea water.

U.S. Pat. No. 6,520,115 by Zemach dated Nov. 19, 2002 offers support platform and structure for fish farming. However, Zemach offers a support platform and structure for fish farming, but Zemach does not define a closed-volume sealed-wall water-filled floatable ring tube with floatation level control in which fish and sea food grow and swim while being isolated from surrounding sea water.

U.S. Pat. No. 8,550,022 dated Oct. 8, 2013 by Yona Becher offers straight long tube container for transferring water from flooded area which is different from the current application.

Conclusion:

None of the above prior art defines a closed-volume sealed-wall water-filled floatable ring tube with floatation level control in which fish and sea food grow and swim while being isolated from surrounding sea water.

Objects and Advantages of the Invention

A 2000 ton high capacity floating at sea multiple water-filled ring tubes, each for selective fish and sea food types, comprises of multiple torus concentric ring tubes of typical 200-500 meter diameter for a high volume floating apparatus at sea and anchored to seabed. The typical 2-5 meter diameter ring tube is filled with water to a controlled level and includes floating level control relative to sea water level in the water-filled ring tube where fish and seafood grows with control of tube floating level relative to sea level.

Each water-filled ring tube comprised of multiple tube segments connected to vertical connecting pipe. Each tube segment comprises of the followings:

1. Helical pipe made of molded composite plastic with steel wire.
2. A transparent helical plastic molded flexible strip wall pipe is helically wrapped between every two pipe turns of said helical pipe to create a sealed tube.
3. Helical internal and external clamping means to attach said helical strip wall to said helical pipe
4. An helical balloon is helically wrapped and mechanically held within said strip wall contour and is connected to an commercial air compressor which controls the of volume of the helical balloon for closed loop floating level control with floating level sensor input.

5. Flanged end pipe connecting the two ended of each tube segment to vertical connecting pipe Multiple vertical connecting pipes connected with bolted flanges between each two said tube segments with multiple flanged connections to external source intended for the insertion and removal of fish or seafood and food from the ring tube.

Multiple air pressurized control valves connected to each tube segment for controlling water flow and air into the ring tube segments.

The main field of the invention is related to typical 2000 ton capacity floatable water-filled ring tube apparatus for growing selective fish and seafood such as shrimps within large volume of 200-500 meter diameter of a toroid or doughnut ring shape tube with 2-5 meter typical tube diameter partially filled with the surrounding sea water.

It is also related to a multiple concentric floatable large diameter aquaculture apparatus of toroid doughnut ring shape tubes with automatic controlled floatation above sea level, each is independent aquaculture growing apparatus for various fish and seafood types. In addition the floatable aquaculture ring tubes are anchored to the bottom of the sea and keep their location in sea under severe sea storms.

The water level inside each of the multiple tube segments is controlled by said pressurized air controlled valves.

In addition, the field of the invention includes creating new high volume of more than 2000 cubic meters per ring tube, filled with the surrounding sea water, floating in the surrounding sea water and anchored to the seabed, with each water-filled ring tube circumference exceeds 600 meters, for the fish and seafood to swim around. In each water-filled ring tube there are only one or more selected types of ship to prevent certain fish type killing and eating other weaker types. It provides high volume new domestic local business sources along the Atlantic and Pacific oceans and along ocean and seashores all over America and around the world aiming at solving the lack of available supply of fresh fish and sea food to meet the new increased demand for healthy food at low cost in America and all over the world.

The high-volume water-filled ring tube apparatus would guarantee a plenty of fresh and locally grown supply of healthy fish and seafood for decades to come as at lower price and will replace historical low technology fishing in far from home rough oceans, thousands of miles away of frozen fish. In most oceans such as Atlantic and Pacific certain fish species and seafood are vanishing and their prices are soaring in American restaurants and in restaurants around the world where low income people cannot afford paying for high quality fish and sea food.

Therefore, the invention is related to developing a high volume of steady and reliable supply of high quality commercial fish and seafood of pre-selected types raised locally along the seashores of America and along seashores around the world.

Furthermore, domestic aquaculture local business will create millions of jobs in America and around the world and support vibrant coastal community's economies along seashores.

Table of Items and their Location in the Drawings

| Item name | Item Number | FIG. number |
|---|---|---|
| ring tube | 1, 2, 3, 4 | 1, 1A |
| central floating member | 5 | 1, 1A |
| cable | 6 | 1 |

-continued

Table of Items and their Location in the Drawings

| Item name | Item Number | FIG. number |
|---|---|---|
| air compressor | 7 | 1, 1A |
| electrical battery | 8 | 1, 1A |
| internal combustion engine & fuel tank | 9 | 1, 1A |
| ring tube segment | 12, 13, 14, 15 | 1, 1A, 1B, 2 |
| vertical connecting pipe | 16, 17, 18, 19 | 1, 1A, 1B, 1C, 2 |
| helical pipe | 24 | 3, 3A, 3B |
| wire reinforcement | 24a | 3B |
| helical strip wall | 25 | 5, 5A, 5B |
| upper L-shape helical end protrusion | 25a, 25b | 5, 5A, 5B |
| dovetail concavity | 25g, 25h | 11 |
| External helical clamp | 26 | 8 |
| Internal helical clamp | 26a | 9 |
| Helical balloon | 28 | 12 |
| Helical dovetail protrusion | 28a, 28b | 13 |
| balloon end hose | 28e | 4 |
| end connector pipe | 30 | 3, 3A |
| end connector pipe flange | 30a | 1C, 1B, 2, 7 |
| end connector threads | 30b | 7 |
| vertical connector tube lateral flange | 30c | !C, 1B, 2 |
| lateral flange bolts | 30d | 2 |
| floating level switch | 31 | |
| magnetic member | 32a, 32b | 9 |
| vertical member | 33 | 8, 9 |
| floating member | 32 | 9 |
| magnetic switch | 34a, 34b | 8, 9 |
| air operated valve | 39 | 2, 3 |
| valve housing | 39a | 10A |
| flanged outlet port | 39b | 10A |
| moving piston | 39c | 10A |
| Inlet flow holes | 39d | 10A |
| return spring | 39e | 10A |
| screen disc | 41 | 11 |
| screen hole | 41a | 11 |
| pipe upper flange | 43 | 1C, 2 |
| pipe lower flange | 44 | 1C, 2 |
| lower flange cover | 45 | 1 |
| upper flange cover | 46 | 1 |

BRIEF DESCRIPTION OF THE DRAWINGS

The invention as herein described, by a way of example only, with reference to the accompanying drawings, wherein:

FIG. 1 is a preferred embodiment of multiple floating water-filled ring tubes with central floating member, cable connections and anchors FIG. 1C presents greater detailed view of multiple floating water-filled ring tubes FIG. 2 is a preferred embodiment of single floating water-filled ring tube, with four vertical connecting pipes.

FIG. 3 is a preferred embodiment of helical pipe.

FIG. 5 presents top view of ring tube segment.

FIG. 6 presents a detailed cross sectional view of ring tube segment shown in FIG. 5*a*

FIG. 7 is a preferred embodiment view of end connector pipe.

FIG. 10 is a preferred embodiment of air-operated normally open valve

FIG. 10A presents cross section of air-operated valve shown in FIG. 10.

FIG. 11 is a preferred embodiment of screen disc.

DESCRIPTION OF THE PREFERRED EMBODIMENT

Figure 1A:
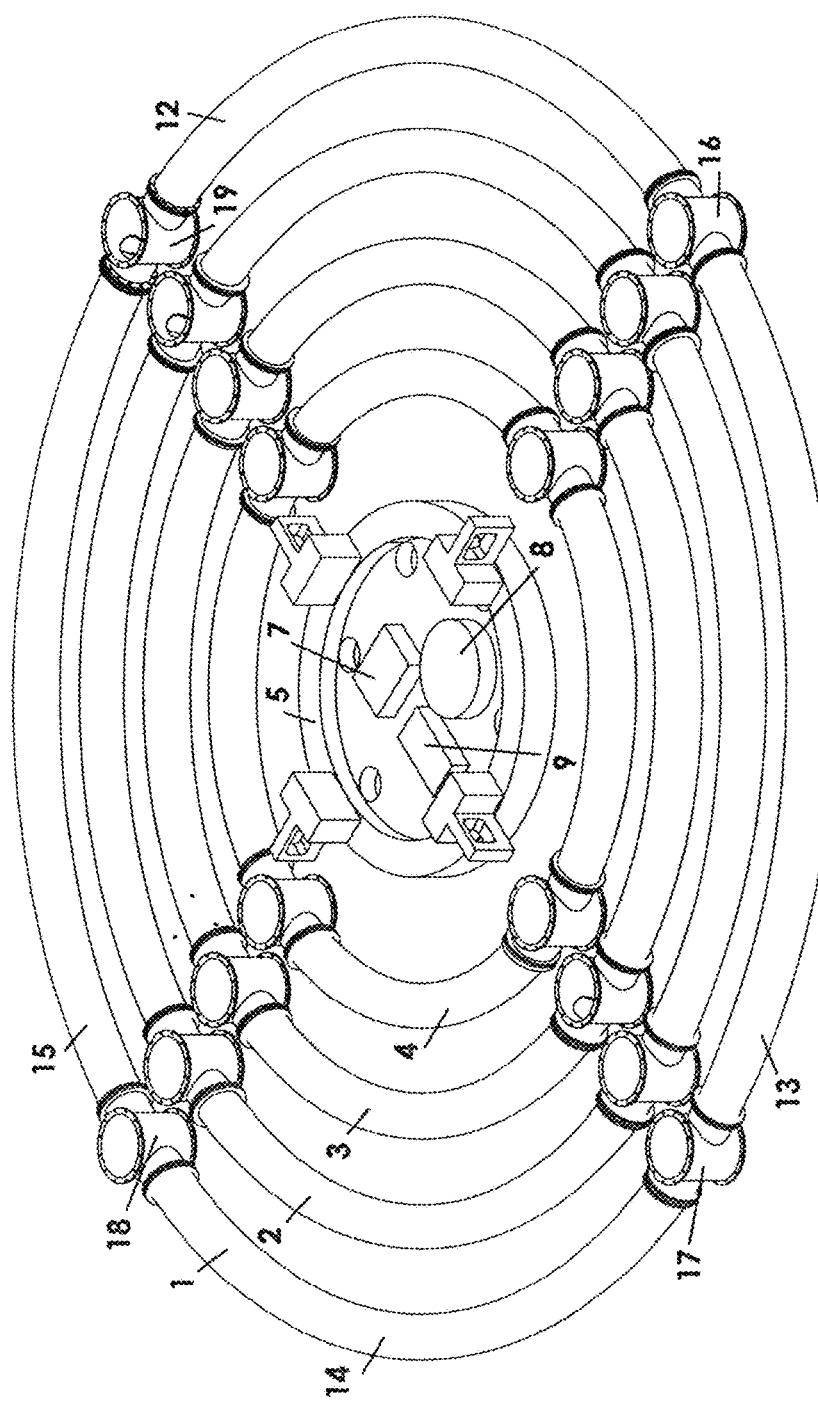
FIG. 1A is a preferred embodiment of multiple floating water-filled ring tubes

FIG. 1 presents a preferred detailed embodiment of multiple water-filled ring tubes 1, 2, 3, 4 with central floating member 5, with said water-filled ring tubes connected to each other and to said floating member 5 with cables 6, and with said floating member equipped with engine operated air compressor 7, with air pressure hoses connecting to said ring tubes, electrical wires connected to said air compressor 7 and to said ring tubes, electric battery 8 and internal combustion engine 9 with fuel tank to operate said air compressor. Multiple anchoring cables 20 connected to floating member 5, are securely anchored to the seabed base to keep the apparatus from moving laterally and to keep its location fixed to the seabed.

Figure 1B:
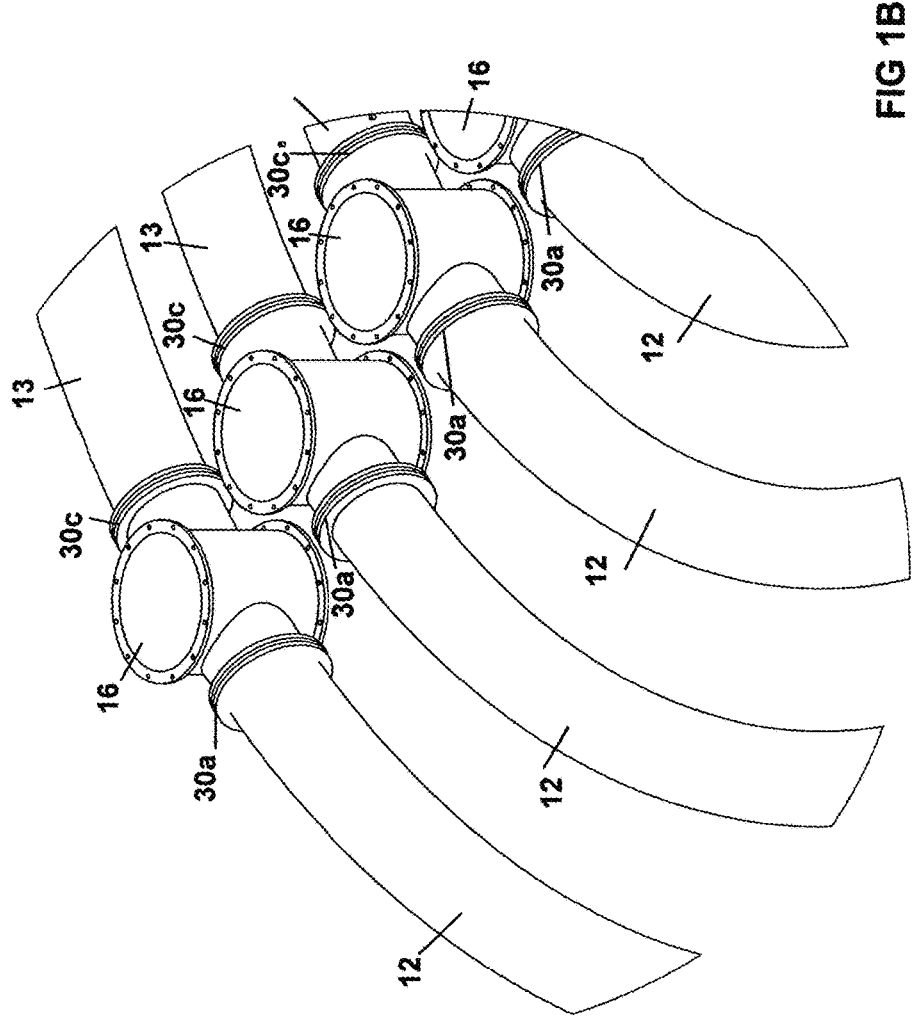
FIG. 1B is a detailed view of multiple floating water-filled ring tubes

Referring to FIG. 1A, FIG. 1B and FIG. 1C, a detailed preferred embodiment of multiple water-filled ring tube 1, 2, 3, and 4, each comprises of four ring tube segments 12, 13, 14 and 15 connected to with four vertical connecting pipes 16, 17, 18 and 19 to create a closed ring. Each upper vertical connecting pipe ends with flange 43 with cover 45, and each lower vertical connecting pipe ends with flange 44 and flange cover 46 as shown in FIG. 1.

Referring to FIG. 2, a preferred embodiment of a single water-filled ring tube 1, 2, 3, and 4 comprises of four ring tube segments 12, 13, 14 and 15, each connected in both ends to four vertical connecting pipes 16, 17, 18 and 19 to create a closed ring tube. Two Lateral Flanges 30c of each vertical connecting pipe 16, 17, 18 and 19 are bolted to end connecting pipe flange 30a on each side of segment 12, 13, 14 and 15 to create a closed ring tube 1, 2, 3 and 4.

Referring to FIG. 2, a view of the preferred ring tube segments 12, 13, 14 and 15 with constant circular cross section. Each ring tube segment has typical pipe cross sectional diameter of 2-5 meters, and they are connected together to create a closed ring tube with typical diameter of 200-500 meter, and with typical 2000 cubic meter volume. The ring tubes 1, 2, 3 and 4 are filled with sea water to a controlled water level, with atmospheric pressure air above the water through air-pressure operated normally open valves.

FIG. 3 shows flexible helical pipe 24, made of strong and uniform circular cross section of typical 2-4" diameter, with uniform helical pitch turn of typical 0.5-1.5 meters, cross sectional diameter of 2-5 meters and helical ring diameter of typical 200-500 meters.

Figure 4:
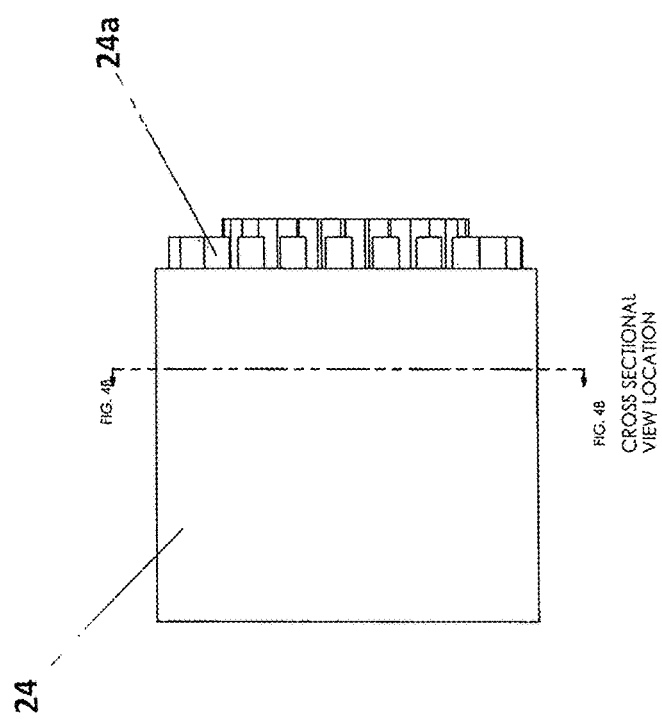
FIG. 4 presents a enlarged detail view of a segment of the helical pipe

FIG. 4 presents section of the helical pipe 24.

Figure 4A:
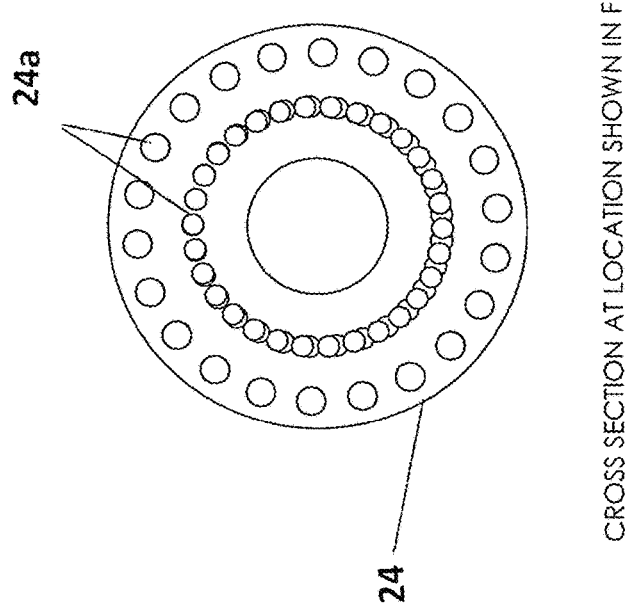
FIG. 4A presents a cross section detail of the helical pipe segment shown in FIG. 4

FIG. 4A shows cross sectional view at the location shown in FIG. 4.

Referring to FIG. 4A, the helical pipe 24 is made of molded composite plastic compound with reinforcement by radial metallic wires 24a, uniformly spread in circular pattern within the pipe cross section.

Figure 5A:
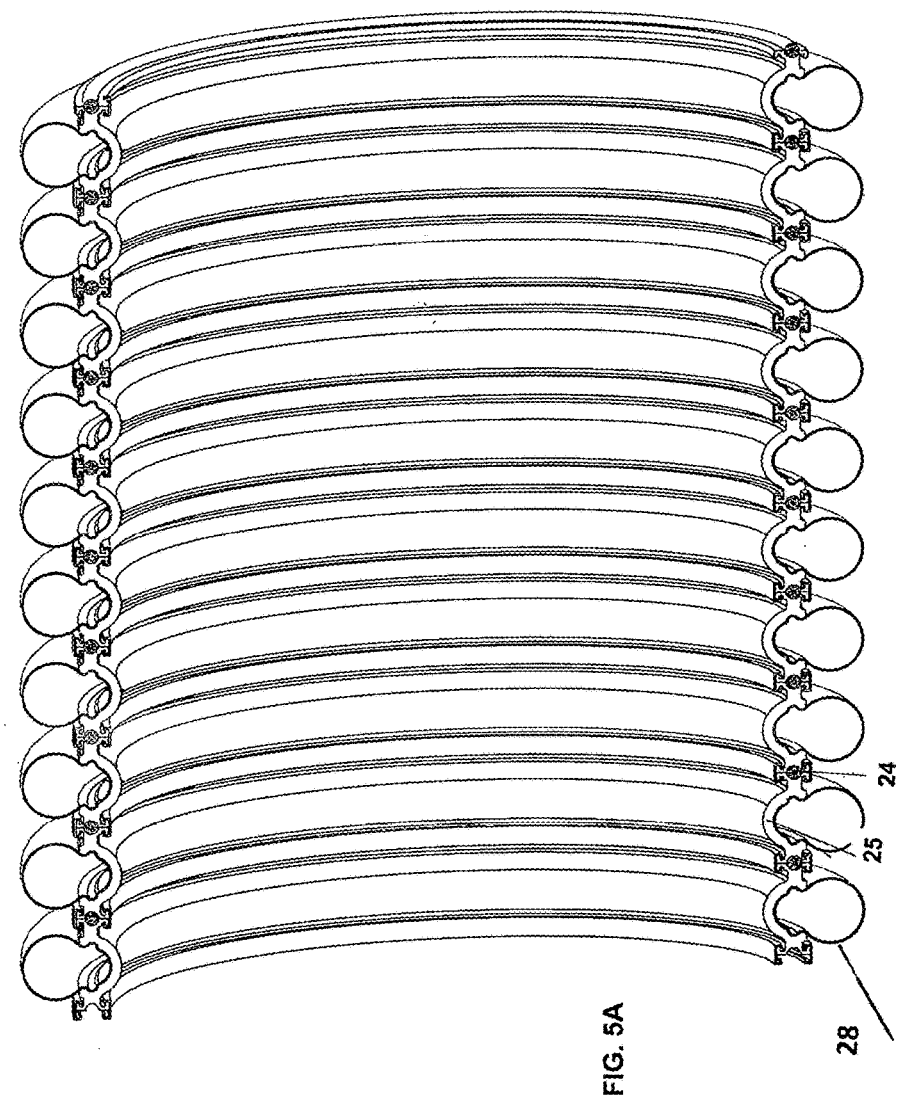
FIG. 5A presents cross section of the ring tube segment shown in FIG. 5

FIG. 5 presents top view of ring tube segment. FIG. 5A presents a cross sectional view of the ring tube segment shown in FIG. 5. The ring tube segment comprises of transparent helical strip wall 25 wrapped around helical pipe 24, filling the gap between each two helical pipe 24 turns, and encapsulating each helical pipe 24 from both sides, and providing a water-sealed wall and pressure boundary to water-filled ring tube segments 12, 13, 14 and 15. The helical strip wall 25 prevents water flow between inside the ring tube and the surrounding external sea water. The helical strip wall 25 is made of transparent flexible molded plastic compound such as nylon. The helical balloon 28 is wrapped around the helical strip wall and provide floatation and buoyancy means to the ring tube segment.

Figure 6A:
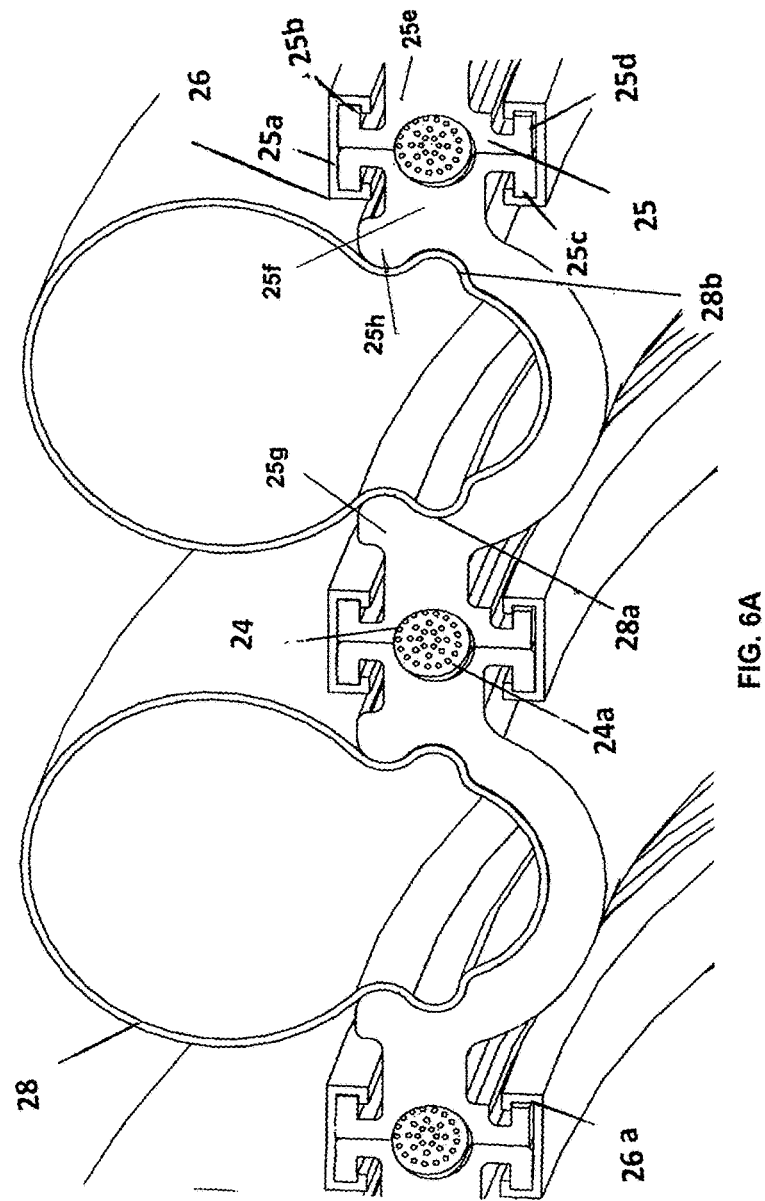
FIG. 6A presents enlarged detailed cross sectional view of ring tube segment

FIG. 6 presents a detailed cross sectional view of ring tube segment shown in FIG. 5a. FIG. 6A presents an enlarged scale detail of the cross sectional view of the ring tube segment 12, 13, 14, and 15.

The Lower left side L-shape helical protrusion 25a and lower right side L-shape helical protrusion 25b of the helical strip wall 25 engages with internal helical clamp 26a. Similarly, upper left side L-shape helical protrusion 25c and upper right side L-shape helical protrusion 25d of the helical strip wall 25 engages with external helical clamp 26. Half-circular helical cavity 25e on the right end side and 25f on the left side of said helical wall strip 25 encapsulate the helical pipe 24 circular cross-section on both sides, sealing the helical gap between each two turns and creating a sealed pressure boundary wall between sea water outside and sea water inside the ring tube segment 12, 13 14 and 15. Left dovetail concavity 25g and right dovetail concavity 25h mechanically fix helical balloon relative to said helical strip wall 25.

FIG. 6A shows an internal helical clamp 26a with helical c-shape cross section engages lower L-shape helical protrusions 25a and 25b of said helical strip wall 25. An external helical clamp 26 with helical c-shape cross section engages upper L-shape helical protrusions 25c and 25d of said helical strip wall 25. FIG. 6 and FIG. 6A present a cross sectional view of transparent helical balloon 28. Helical dovetail protrusions 28a and 28b on right and left side of the helical balloon 28 respectively engage with concave dovetail 25g and 25h respectively of the helical strip wall 25. Both ends of helical balloon are sealed and each equipped with helical balloon inflating valve. The helical balloon inflating valve hose is connected through air pressure hose to the air pressure compressor 7. The helical balloon 28 is made of transparent thin wall molded rubber compound. When pressurized with compressed air from said air compressor 7, the helical balloon is inflated, its volume increases, the buoyancy of said ring tube segment 12 increases and the floating level relative to sea water increases.

FIG. 6A shows a cross sectional view of the said-helical balloon 28 mounted within the helical strip wall 25 with external helical clamp 26 and with internal helical clamp 26a.

Referring to FIG. 7, view of the preferred embodiment of the end connector pipe is shown. End connector pipe 30 is threaded into the end turns of the helical pipe 24 on both sides of segment rings 12, 13, 14 and 15. Each flanged end 30a of the end connector pipe 30 is secured with multiple bolts to lateral flange of said vertical connecting pipe 16, 17, 18 and 19. The end pipe 30 is made of flexible plastic molding compound.

Figure 8:
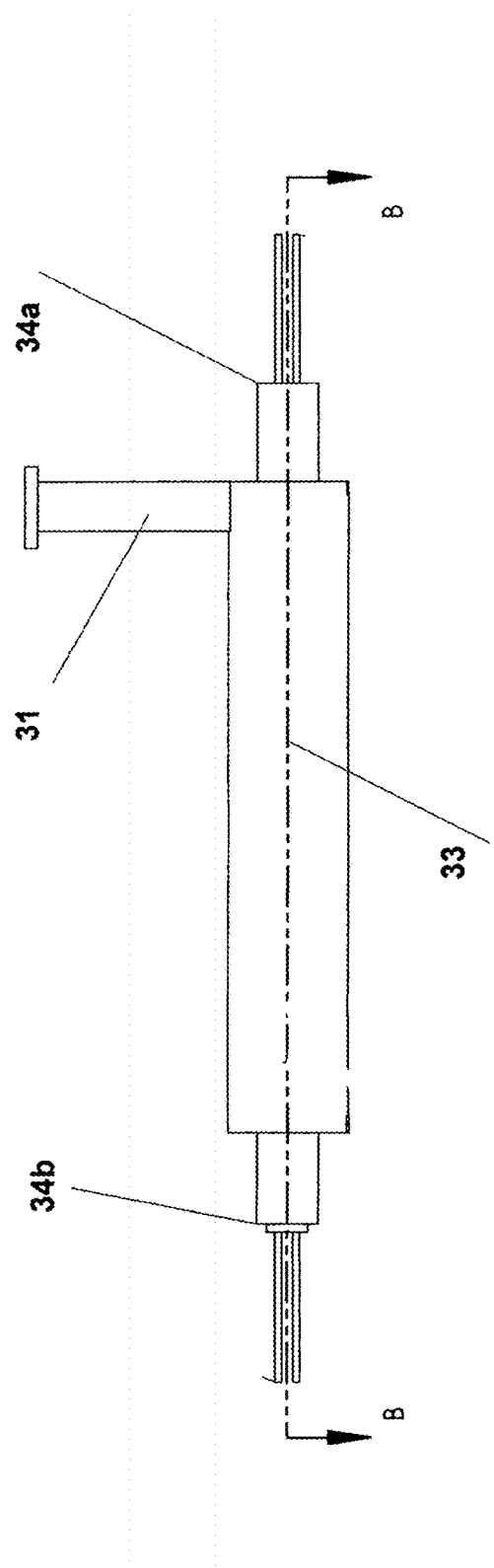
FIG. 8 is a preferred embodiment of floating level switch
Figure 9:
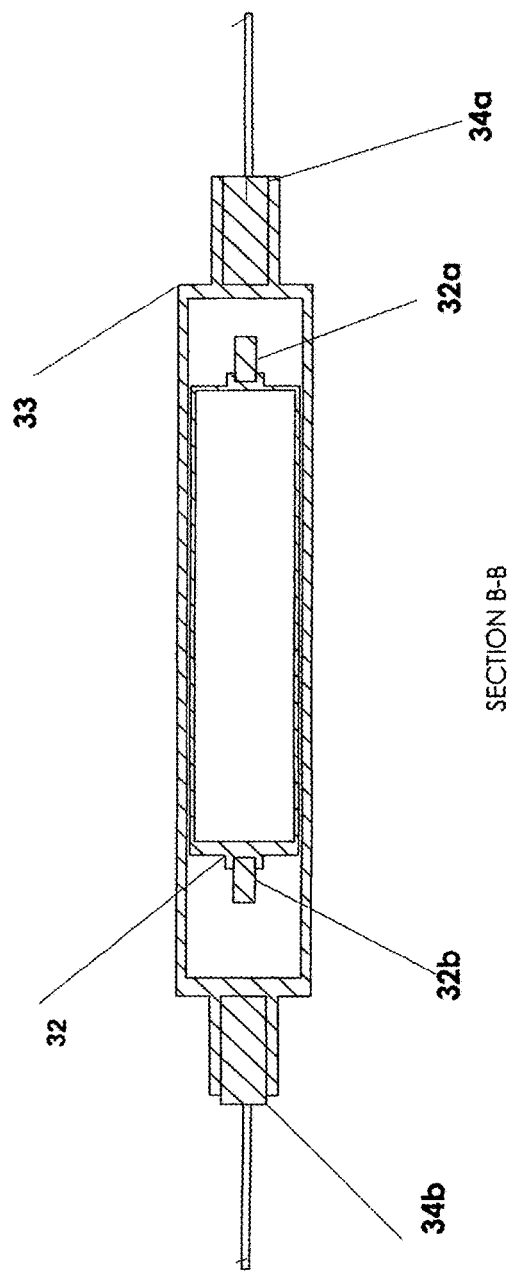
FIG. 9 presents a cross sectional view of floating level switch shown in FIG. 8.

Referring to FIG. 8, view of the preferred embodiment of floating level switch is shown. FIG. 9 presents a cross sectional view of said floating level switch 32. The floating level switch 31 provides low level electrical signal at minimum floating level setting and high level electrical signal at maximum floating level setting. The floating level switch comprises of vertical cylinder 33 and a cylindrical floating member 32. A magnetic member 32a is attached to the floating member 32 lower side and magnetic member 32b is attached to its upper side. The-cylindrical floating member 32 is floating in sea water within vertical cylinder 33 which is equipped with lower magnetic switch 34a attached to its lower end and with upper magnetic switch 34b attached to its upper end. The vertical cylinder 33 mounting adaptor is bolted to each one of four vertical connecting flanged pipes 16, 17, 18 and 19. When upper magnetic switch is energized, said ring tube segments 4, 5, 6, 7 are at lowest floating level setting. The floating level switch 32 operates the air compressor pressure 7 to inflate the helical balloon 28 to increase the pressure of helical air balloon 28 for increased buoyancy of the ring tube segment 12, 13, 14 and 15. When lower magnetic switch is energized, the ring tube segments 12, 13, 14 and 15 are at highest floating level setting. Therefore, the air compressor 7 will stop inflating helical balloon 28 to reduce the pressure of the helical balloon 28 for decreased buoyancy.

FIG. 10 is preferred embodiment of air-pressure operated normally open valve 39. FIG. 10A is a cross section of the air-pressure operated normally open valve. Multiple valves are connected through helical strip wall 25, allowing water flow into and out of the ring tube segments 12, 13, 14 and 15. The valves 39 also allow air flow into the upper side of water filled ring tube. When operated with air pressure from the air compressor 7, valve 39 is closed and prevents water flow across the wall of the helical strip wall 25 to control water level in the ring tube. The air operated valve 39 comprises valve housing 39a and moving piston 39c is pushed away from flanged outlet port 39b by return spring 39e to open the normally open sea water or air flow path from multiple radial holes 39d to outlet port 39b. When air pressure is applied to the valve, the moving piston 39c moves against spring 39e, sealing outlet port 39b, preventing water or air flow into the ring pipe segments 12, 13, 14 and 15. Air operated valve housing 39a and moving piston 39c are made of molded plastic compound.

Shown in FIG. 11, a detail view of preferred embodiment of screen disc plate 41 with multiple screen holes diameter 41a, for controlling the size of fish moving from one ring tube segment to another for optimum fish growing efficiency.

What is claimed is:

1. A water-filled ring tube apparatus for floating in a sea, wherein said ring tube apparatus comprising:
   a. a plurality of ring tube segments, each said plurality of ring tube segments having a flange on each end, wherein said each plurality of ring tube segments comprises:

a helical pipe made of plastic molded material with metallic wire reinforcement, wherein said helical pipe provides mechanical structural support for said ring tube segment;

a transparent helical strip wall wrapped between each two helical turns of said helical pipe, wherein said helical strip wall creates a water tight wall for said ring tube segment;

external and internal helical clamps, each said external and internal helical clamps having c-shaped cross section, wherein said external and internal helical clamps secures ends of said helical strip wall to said helical turns above and below said helical pipe; and a helical air balloon, wherein said helical balloon wraps around said helical strip wall and secured to said helical strip wall with dovetail concavity and protrusion;

b. a plurality of vertical connecting pipes, each said plurality of vertical connecting pipes having two lateral pipes with flange on each end, wherein said plurality of ring tube segments flanged ends are connected to flanged ends of said lateral pipe of said plurality of vertical connecting pipes to create closed ring tube;

c. a plurality of air-operated valves, wherein said plurality of air-operated valves control water flowing into said ring tube segments from surrounding sea, each of said plurality of air-operated valves comprising:

a valve housing having an outlet port with a flange;

a return spring;

a piston moving within said valve housing and pushes away from said outlet port by said return spring to open said water flowing into said valve housing;

a plurality of radial holes through a wall of said valve housing, wherein said plurality of radial holes allow surrounding water to flow into said each ring tube segment, wherein when air pressure is applied to said each plurality of air-operated valves, said piston moves against said return spring and seals said outlet port and prevents water or air flow into said ring tube segments.

2. The water-filled ring tube apparatus of claim 1, further comprising a floating level switch including an upper magnetic switch, a lower magnetic switch, an upper magnetic member, a lower magnetic member, and a vertical cylinder, wherein when said upper magnetic switch is energized, said plurality of ring tube segments are at a lowest floating level setting, said floating level switch operates an air compressor pressure to inflate said helical balloon to increase a pressure of said helical air balloon for increased buoyancy of said plurality of ring tube segments, when said lower magnetic switch is energized, said plurality of ring tube segments are at a highest floating level setting where said air compressor will stop inflating said helical air balloon to reduce said pressure of said helical air balloon for decreased buoyancy.

* * * * *